3,208,976
POLYMERIZATION AND COATING PROCESS
Stanley D. Zimmerman, Lake Charles, La., and William S. Thompson, Austin, Tex., assignors, by mesne assignments, to Columbian Carbon Company, a corporation of Delaware
No Drawing. Filed July 1, 1960, Ser. No. 40,133
4 Claims. (Cl. 260—73)

This invention is concerned with the preparation of a copolymer of butadiene and certain olefinic monoaldehydes and the coating of metals therewith.

One of the problems with which the invention is concerned is the protection of metal surfaces against deterioration and particularly against corrosion. Specifically, the invention is utilized in the coating of sheet metals utilized in containers, cans, bottle crowns, screw-top caps, and similar articles. The protective coatings also are useful for metal articles in general.

Difficulties have been encountered in prior attempts to prepare and use butadiene polymers and copolymers in forming coatings such as the preparation of can linings. Thus, in the use of polymers prepared with Friedel-Crafts catalysts such as aluminum chloride, a common deficiency appears in subjecting the product to "boiling water" tests in that apparently residual aluminum chloride is hydrolyzed to aluminum hydroxide, producing a result called blushing in which the coating has a milky or hazy appearance and in some cases a streaked appearance. Other coatings have been prepared from polymers obtained using various catalysts including sodium, peroxides and other catalysts, and such polymers often are not fully satisfactory in that they are either too brittle and fracture in operations such as the can forming operation, or are excessively soft and rubbery, and undergo deformation to such an extent that they are unusable. Also, in some cases, polymers including halogens and acetate radicals have caused difficulty in that in contact with certain can contents these polymers release halogens, halogen acids or acetic acid.

In polymerizing certain olefinic aldehydes such as acrolein, the prior art suggests that to avoid the formation of highly cross linked and insoluble gel, it is necessary to polymerize such aldehydes in the presence of substantial quantities of an alcohol, or to add such alcohol immediately after polymerization. Alcohols are relatively expensive solvents, and recovery thereof at the point of use of the solution is not economically attractive.

An object of the present invention is to provide a novel copolymer of butadiene and certain olefinic monoaldehydes, said polymer having desirable characteristics, and a process of preparing the same without the need for the use of alcohols during or after polymerization.

Another object of this invention is to provide a novel metal article having a resinous coating thereupon prepared from the copolymer of the invention, and a process of preparing such article. Yet another object is to obtain and utilize a liquid or semi-liquid copolymer in accordance with the preceding objects of invention.

The monoolefinic, monoaldehydes used in preparing the copolymers of the invention are α,β-unsaturated aldehydes corresponding to the formula

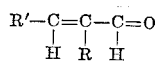

wherein R and R' may be the same or different and are radicals selected from the group consisting of hydrogen, alkyl, and aryl. It is desirable that either R or R' be hydrogen. Thus, the radicals R and/or R' may be hydrogen, methyl, ethyl, propyl, butyl, isopropyl, isobutyl, phenyl, tolyl, biphenyl, benzyl, or naphthyl, for example. Preferably, acrylic aldehyde or α-methylacrylic aldehyde is utilized (hereinafter called acrolein and methacrolein). Other useful aldehydes include crotonic, isocrotonic, β-ethylacrylic, isohydrosorbic, and cinnamic. As may be seen, the preferred radicals are alkyl groups having four or less carbon atoms, hydrogen, and aryl groups having a single benzene ring, unsubstituted, or less preferably substituted with one or more alkyl radicals or having two benzene rings.

The polymer is prepared by reacting the comonomers, consisting of about 99.9 to 90% butadiene, with about 0.1 to 10% by weight of an aldehyde corresponding to the above formula, using an inert organic solvent, certain organic peroxide initiators or catalysts, and moderately elevated temperatures. An unsaturated polymer having desirable characteristics, including definite unsaturation types and proportions thereof, is obtained. Between about 0.1% and 15% of the polymer weight is attributed to the aldehyde, in the case of methacrolein as determined by infra red spectroscopy. The molar ratio of the aldehyde of the above formula, to butadiene, in the polymer, is between about 0.1 to 2 and 0.5 to 2, as determined by infra red data. Other methods, including titration and calculations based on carbon and hydrogen determinations are useful. As is customary in the art, percentages based on carbon and hydrogen determinations and on titration are on a weight basis, and those obtained by infra red spectroscopy are on a volume basis. Quantitative values ascertained by the latter method are approximations, but are sufficiently reliable as a control technique to determine important polymer properties on a reproduceable basis. Such infrared data is of particular benefit in comparing unknowns with known molecular configurations as in determining carbonyl content by comparison with a heptanal or benzaldehyde standard, or in establishing proportions of unsaturation types and ratios of one unsaturation type to another.

The polymer is applied to metallic substrates such as sheets or preformed articles and cured preferably in the presence of oxygen, with heat if desired, forming an exceptional resinous coating which is hard, flexible, chemically resistant, and strongly adherent to metals. The coated articles may be used as such or subsequently mechanically formed into other articles.

This invention resides partially in the discovery that copolymers of butadiene and the above aldehydes prepared under the conditions of this invention, are markedly superior to somewhat similar polymers prepared by other methods. The polymers of this invention are believed to have distinctive macromolecular structures, both in the uncured, and cured, solid forms of polymer. This distinctive structure is believed to be one reason for the superiority of the final coatings obtained. Relevant details of the molecular structure are indicated by the types and the ratios of unsaturation types in the uncured polymer and are dictated by the particular monomers utilized, polymerization conditions and similar features.

"Butadiene" refers to 1,3-butadiene as is conventional. The monomers need not be absolutely pure; materials which inhibit the reaction should be absent, but if present, should be present in minimum amounts.

Throughout the specification, all parts are by weight, unless otherwise noted.

Polymerization conditions are variable but generally are within limits which are critical. Useful catalysts or initiators include benzoyl peroxide, t-butyl hydroperoxide, cumene hydroperoxide, t-butyl perbenzoate, acetyl peroxide, similar peroxy compounds which are soluble in the reaction diluent or solvent, and mixtures thereof.

The quantity of peroxide varies between about 0.1 and 10%, preferably between about 1 and 5%, based on the weight of the monomers. The time is related to temperature, and is between about 1 and 5 hours. The time, in general, is varied inversely with temperature. Elevated temperatures of 50 to 200° C. are useful although about 100 to 150° C. is preferred. Solvents are desirably utilized, and inert, non-polar solvents are preferred. Useful solvents are those which do not react with the monomers, are inert to the catalyst, and do not polymerize in this reaction. Included are ligroin, benzene, xylene, cyclohexane, toluene, pentane, hexane, heptane, 1,4-dioxane, petroleum ether, and similar compounds or mixtures thereof. Other solvents including acetone and methyl ethyl ketones may be used, although preferably mixed with the above solvents. The preferred ratio of solvent or diluent to co-monomers, by weight, is between one to two and three to one although higher ratios such as five to one and lower ratios such as one to three may be used. Whether or not solvent is used, a homogenous system is preferred, rather than a heterogenous or emulsion system. The pressure is the autogenous pressure developed by the system, and is preferably between about 100 and 300 p.s.i.a. Higher and lower pressures are useful, for example, from about 20 to about 1,000 p.s.i.a. may be used.

Post-polymerization treatment of the polymer solution includes separating the gaseous fluids from the liquid fluids in the reactor, separating unreacted aldehyde, if any, followed by polymer isolation by simple evaporation. The polymer solution is preferably heated under vacuum to remove the solvent and obtain the pure polymer. In the event the solvent is one known to be useful in the coating operation and the polymer does not have a low enough viscosity for convenient application as a coating with no solvent present, at least a part of the solvent may be retained with the polymer dissolved therein. Alternatively, the polymer solution may be treated with an excess of methanol, for instance three times the volume of the solution which precipitates the polymer. The precipitated polymer is then isolated for instance by decantation and by evaporation of the remaining solvent and methanol. This latter method removes methanol-soluble fractions. The polymer recovered by either method is substantially free of any solvent including alcohol, and retains its solubility in common organic solvents.

The polymer at about 20° C. is preferably an oily liquid having curing properties of drying oils; it is less desirably in the form of a soluble solid or soluble semi-solid, said solid polymers not being cross-linked appreciably. Highly cross-linked, insoluble or difficultly soluble gels are not suitable. In any event, the polymer must be curable to a resinous state as described herein. The intrinsic viscosity of the polymer is preferably between 0.08 and 0.45 deciliter per gram at 100° F. In utilizing the polymer, the viscosity of the liquid polymer or of a polymer solution of the liquid, semi-solid, or solid polymer, is preferably between 1000 and 5000 centistokes at 25° C. Higher and lower values are useful for some applications, since it is known that polymers having viscosities ranging from 3 to 100,000 centistokes at 25° C. may be applied as coatings. Polymer solvents, if used, may be the same as the reaction diluents listed above, although higher boiling materials such as xylene are preferred.

The reason for the fact that the specific polymers of this invention are resistant to substantial gel formation under normal storage conditions is not known.

The polymerization process may be conducted in batches or continuously.

The macromolecular structure of the polymers according to this invention is relatively constant or reproduceable as defined by the amounts and quantitative ratios of unsaturation types, total determinable unsaturation, and the ratios of monomers in the reaction mixture. "Unsaturation types" as the term is used herein refers to the mode of substitution of hydrogen and carbon atoms about a carbon to carbon double bond, i.e.,

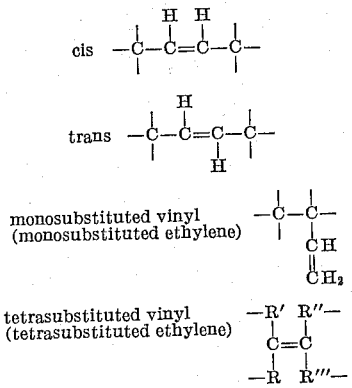

This terminology is also described in part in Chemical and Engineering News, vol. 37, No. 12, page 59, March 23, 1959.

Absorptivity data for the determination of the several olefin types were from the spectra obtained prior to the determinations described herein from known olefins. These absorptivities confirmed those reported in the literature, e.g., McMurry, H. L., and Thornton, Vernon, "Correlation of Infrared Spectra of Paraffins, Olefins, and Aromatics With Structure"; Analytical Chemistry, vol. 24, pages 318–34 (1952). It has been postulated that a variable amount of cyclization takes place in butadiene polymers; however, tetrasubstituted vinyl unsaturation is not readily ascertainable by infrared data. The quantities of the several types of unsaturation were determined from infrared spectra at wave lengths of 10.98±0.2 microns for monosubstituted vinyl unsaturation, 10.34±0.2 microns for trans unsaturation, and about 14 microns for cis unsaturation. Absorptivities for these determinations were:

| | Liters/mole-cm. |
|---|---|
| Cis | 92 |
| Trans | 118 |
| Monosubstituted vinyl | 149 |

The infrared spectrometer used was a Baird, Model 455. It is believed that the cis and trans unsaturation types are the result of 1,4 addition, as regards the butadiene monomer units.

Amounts of such unsaturation types as determined by infrared spectroscopy in the polymer according to this invention are in the following approximate ranges:

| | Moles/100 g. |
|---|---|
| Cis | 0.05–0.15 |
| Trans | 0.70–0.90 |
| Monosubstituted vinyl | 0.30–0.45 |

Total chemically determined unsaturation ranges from about 1.10 to about 1.75 moles/100 g., and total unsaturation according to infrared analyses ranges from about 1.00 to about 1.60 moles/100 g. The qualities of the adherent, hard, flexible, cured coating are believed due in large part to the structure of the curable polymer as defined above. The following are representative of the methods for preparing the polymers of this invention, useful to form cured resinous coatings upon metal, all parts being by weight in the examples and elsewhere herein, unless indicated otherwise:

EXAMPLE 1

The polymers of this example were made in a one gallon stirred autoclave. Five batches designated 1–A, 1–B, 1–C, 1–D and 1–E were run. The reactants, butadiene and methacrolein or equivalent aldehyde were employed in various ratios including about 97.5:2.5; 95:5; and 90:10. Two percent of the total weight of reactants was equal to the weight taken as the initiator, t-butylhydroperoxide. The total weight of reactants and initiator was then equal to 50 weight percent of the total charge, the remaining 50 percent being the solvent, petroleum naphtha.

The initiator or catalyst, t-butylhydroperoxide in this case was dissolved in the naphtha with the aldehyde and the solution was charged to the autoclave. The butadiene was introduced and the autoclave was sealed and then heated to 130° C.±1° C. for one hour.

At the end of this time, the contents of the autoclave were cooled to 50° C. and most of the unreacted butadiene vented into a Dry-Ice-cooled pressure bomb together with some by-products and solvent. When the pressure had decreased to near atmospheric, the contents of the autoclave were removed.

Table I gives the polymerization conditions.
Table II gives polymer characteristics and analyses.

*Table I*

| Run No. | Reaction time, hrs. | Wgts. matls. charged in grams | | | |
|---|---|---|---|---|---|
| | | Butadiene | Aldehyde | t-Butylhydroperoxide | Naphtha |
| 1A | 1.0 | 660 | a34.7 | 14 | 709 |
| 1B | 1.75 | 660 | a17 | 14 | 691 |
| 1C | 1.0 | 530 | a58 | 12 | 600 |
| 1D | 1.33 | 600 | b30 | 12 | 600 |
| 1E | 4.0 | 600 | b15 | 12 | 600 | a Methacrolein.   b Cinnamaldehyde.

The polymer solutions were then placed in a flask and evaporated on a Rinco Spin-drier under vacuum at about 50° C. to remove solvent and unreacted monomers. The polymer from Run 1A was precipitated from the solvent by the use of methanol, then dried in a Spin-drier.

The two cinnamaldehyde-butadiene copolymers were prepared in the same way as were the methacrolein copolymers, without alcohol precipitation. All of the polymers were liquids.

Analyses were made of the methacrolein or cinnamaldehyde content by carbonyl analysis and infrared spectroscopy, and titration was made for unsaturation using the iodine monobromide method. Analysis for unsaturation were also made by infrared spectroscopy.

The results for the percent methacrolein in the polymer as determined by carbon-hydrogen analysis and by percent carbonyl by infrared compare well one with the other.

plied to flat sheet metal, followed by curing, then by forming the desired article. Alternatively, a previously formed article such as a can may be coated, and the coating then cured. Preferably the polymer coating is cured in the presence of air at temperatures between about 150° C. and about 500° C. for a period of between about 0.1 second and about 15 minutes. Other temperatures, for example, still lower temperatures, are useful with adjustment of the time for curing. In addition to conventional baking ovens, using radiated heat for example, induction heating may be used. Hot natural gas combustion products, comprising air, may come into direct contact with the coating being cured. The mechanism of curing is analogous to that of drying oils, and involves oxidation, further polymerization, and cross-linking of the synthetic drying oil or polymer.

By way of illustration, the description as to a metal substrate is directed primarily to electrolytic tin coatings upon ferrous metal, black iron, and aluminum, although other metals are useful as hereinafter set forth. A particularly important area of application of this invention is in the can lining art.

Some of the problems encountered in obtaining satisfactory can linings are apparent in that resinous linings must be resistant to can contents, alkalies, acids, moisture, and solvents. They must be non-toxic, odor-free, and develop no flavors on standing. Processing of the can after applying the coating, involving fabrication, cutting or stamping and the formation of seams, including steps such as soldering, causes many lining materials to fail. The can may be processed along with its contents for periods of an hour or more at temperatures of 200° to 400° F., the canned products stand for one to two years before being used, and any deterioration of the container may contaminate the contents. Accordingly, one of the more important objects of the invention is to provide superior can linings.

In addition to can linings the process and product of the present invention include applications such as protective and decorative coatings on articles of hardware such as door knobs, electrical insulation, varnishes, and protective coatings for metals in general.

The particular metal articles useful in this invention are prepared by known methods. Thus conventional tinplate is prepared by electroplating using an aqueous electrolyte to obtain a layer of tin of about 0.03 mil thickness, or ¼ pound of tin per base box. A base box is the area of 112 sheet metal plates 14 inches by 20 inches equal

*Table II*

| Run No. | C and H, percent avg. of 2 detns. | | Unsatn. by I.R., moles/100 g. | | | | Chem. unsatn. | C=O, I.R., mole/100 g. | Methacrolein or cinnamaldehyde, percent | | | |
|---|---|---|---|---|---|---|---|---|---|---|---|---|
| | C | H | Trans. C=C | Cis C=C | Mono subs. Vinyl | Total | | | By I.R. unsatn. | By chem. unsatn. | By I.R. C=O | By C and H |
| 1A | | | 0.88 | 0.09 | 0.36 | 1.33 | 1.39 | 0.08 | 27.5 | 24.5 | 6.2 | |
| 1B | | | 0.80 | 0.09 | 0.40 | 1.29 | 1.44 | 0.04 | 30 | 21.5 | 2.8 | |
| 1C | | | 0.73 | 0.09 | 0.33 | 1.15 | 1.26 | 0.17 | 37.5 | 31.5 | 12.1 | |
| 1D | 86.36 | 10.23 | 0.84 | 0.06 | 0.34 | 1.24 | 1.13 | a0.185 | 32.5 | 38.5 | 24.4 | 28.1 |
| 1E | 87.51 | 11.67 | 0.86 | 0.06 | 0.42 | 1.34 | 1.46 | a0.02 | 27.5 | 21.0 | 3.5 | 6.8 | a Using a benzaldehyde standard; heptanal was the standard for methacrolein copolymers.

This invention also comprises coating a metal surface with the polymer as defined above and curing the coating preferably in the presence of air or oxygen, and preferably by baking. In the case of a flat metal article such as tin plate, the polymer, for example as a 50% solution of non-volatile (NV) solids in vylene may be roller coated by conventional procedures. Other coating methods may be used, including brushing, spraying, or immersing or dipping an article in the polymer composition, the viscosity of the compounded polymer being related to the coating method used. The coatings may be apto 217.78 sq. ft., 20,232 sq. meters, or 31,360 sq. inches. The tinplate may also be ½ pound electro tinplate, and may vary from about ⅛ pound to 10 pounds or more per base box. The surface may be so-called bright tin or may contain an oxide coating anodically or otherwise produced. The oxide coating, if present, may be transparent or opaque. Tinplate coated by hot-dip methods is useful. For the production of black steel or iron conventional treatments include hot aqueous solutions of alkaline compounds such as sodium hydroxide and alkali metal nitrates and nitrites, in which case a black oxide coating is obtained. Other metal surfaces may also be treated according to this invention. For example, aluminum, rolled, "spun," or otherwise formed, may be coated without further treatment or may have an anodically produced aluminum oxide coating thereupon, which in turn may be a porous oxide or may be sealed with hot water, steam, or various nickel and cobalt salts. In addition, steel, zinc, galvanized ferrous metal, copper, brass, and other metal surfaces may be treated using the process of this invention and to obtain the product of this invention.

The liquid film is between 0.005 and 75 mils in thickness, preferably between 0.1 and 2.0 mils, and has a non-volatile polymer content of from 10% to 100%, preferably 50% to 60% as a minimum. The dry film is between about .005 and 50 mils in thickness, and preferably is present in an amount corresponding to 2 to 7 mg./sq. in., although not limited generally to this weight, the approximate useful range for most uses being about 0.3 to 50 mg./sq. in.

Some of the objective and subjective tests of the cured coatings on tinplate may be defined as follows:

I. Wedge bend; five pound weight dropped on wedge of varying sharpness which is placed against a coated sheet of tinplate cured as above and bent generally into a U-shape with the wedge placed in the trough formed thereby. This measures the adhesion, flexibility, and impact resistance of the film, and simulates the formation of a side seam in a can forming operation. Evaluation of this test is performed by immersing the article in a solution of copper sulfate treated to plate copper onto the exposed metallic surface. A score of 100 is perfect.

II. 202 can end fabrications; testing of a can end assembled from tinplate having a cured polymer coating, which assembled can end is placed in copper sulfate solution as above. This measures adhesion and abrasion resistance of a can end double seam, and is rated good, fair, poor or numerically.

III. Boiling water; the cured coated article is placed in boiling water to obtain an indication of the ability of the film to withstand high temperaure processes. Any whitening of the film is called blushing, and any peeling of the film is noted. If the film is satisfactory in this test, it is rated as "passing" the test.

Other tests, such as the conventional pencil "hardness" tests, evaluations of the appearance; dry properties such as tackiness or lack thereof, integrity of the film peeled or scraped from the substrate, adherence to the substrate, and acetone resistance are useful and were employed.

EXAMPLE 2

A typical procedure to apply coatings of the polymers to metal products and to test polymers is illustrated in this example. The polymers were diluted to 50% non-volatiles (NV) in xylene, and means such as a manually operated drawbar was used to apply a liquid film of polymer, or polymer in solution, 1 mil thick, the metal substrate being ¼ pound electrolytic tinplate.

In curing the polymers identical test blanks were subjected to different temperatures, in the presence of air, being approximately 350° F., and 400° F., maximum metal temperature. The articles were subjected to these temperatures for a period of ten minutes.

The results were as follows:

Table III

| Polymer of Example No. | Wedge bend test | | 202 can end test | |
|---|---|---|---|---|
| | 350° | 400° | 350° | 400° |
| 1A | 64 | 55 | 50 | 40 |
| 1B | 83 | 58 | 75 | 40 |
| 1C | 63 | 55 | 60 | 45 |
| 1D | 55 | 50 | 55 | 50 |
| 1E | 80 | 50 | 55 | 45 |

All of the coatings passed the boiling water test, the tabulated tests above being representative of the general physical qualities of the coated panels. The appearance and general physical properties of the coatings including integrity, adhesiveness, and acetone resistance were superior.

An important advantage is that commercial tinplate may generally be used without preliminary removal of oily coatings commonly present. In some cases, however, undissolved gel in the polymer or some other factor seems to cause "eyeholes" to appear in the coating. The eyeholes where they appear may be eliminated readily by purifying the polymer, or compounding the polymer with materials including vinyl type polymers such as polyvinyl butyral, silicone oils and resins, natural drying oil type polymers, "Cellosolve" plasticizers, ethyl Cellosolve, aluminum isopropylate and 2-ethylhexanol, pine oil, and/or various metal "wetting" agents.

Using black iron (CMQ Black Plate) in place of the tin-plated sheet of Example 2, similar results were obtained. Superior results were obtained using aluminum in place of the substrate of Example 2.

The polymers of the invention are amenable to improvement or adaptation by the use of compounding ingredients. Thus, driers such as manganese and cobalt phthalates and oleates are sometimes useful, as are natural drying oils, fillers, pigments, and plasticizers. Carboxylation of the polymers or other known after-treatments may be applied to modify the polymer properties.

We claim:

1. A method of preparing an unsaturated liquid copolymer having drying properties, being soluble in organic solvents, and being substantially free of insoluble gel and of a tendency to readily form such gel under normal storage conditions, comprising the steps of reacting a monomer mixture consisting essentially of about 90 to 99.9% by weight of butadiene and about 0.1 to 10% by weight of an α,β-unsaturated aldehyde of the formula

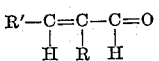

the radicals R and R' each being selected from the group consisting of alkyl, hydrogen, and aryl, at an elevated temperature at superatmospheric pressure, in the presence of an inert non-polar solvent and of 1–5% by weight of the monomers of a peroxy catalyst soluble in said solvent, controlling the conditions so that the proportions of unsaturation types in the resulting polymer are in the ranges of about

| | Moles/100 g. |
|---|---|
| Cis | 0.05–0.15 |
| Trans | 0.70–0.90 |
| Monosubstituted vinyl | 0.30–0.45 | the total unsaturation of the polymer as determined by infrared spectroscopy being in the range of about 1–1.6 moles/100 g., and recovering the polymer as a liquid substantially free of solvent.

2. The method of claim 1 in which said aldehyde is methacrolein.

3. A method of preparing a metal article having a protective coating thereupon comprising the steps of preparing an unsaturated liquid copolymer having drying properties, being soluble in organic solvent, and being substantially free of insoluble gel and of a tendency to readily form such gel under normal storage conditions, comprising the steps of reacting a monomer mixture consisting essentially of about 90 to 99.9% by weight of butadiene and about 0.1 to 10% by weight of an α,β-unsaturated aldehyde of the formula

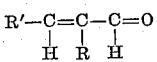

the radicals R and R' each being selected from the group consisting of alkyl, hydrogen, and aryl, at an elevated temperature at superatmospheric pressure, in the presence of an inert non-polar solvent and of 1–5% by weight of the monomers of a peroxy catalyst soluble in said solvent, controlling the conditions so that the proportions of unsaturation types in the polymer are in the ranges of about

|  | Moles/100 g. |
|---|---|
| Cis | 0.05–0.15 |
| Trans | 0.70–0.90 |
| Monosubstituted vinyl | 0.30–0.45 | the total unsaturation of the polymer as determined by infrared spectroscopy being in the range of about 1–1.6 moles/100 g., recovering the polymer as a liquid substantially free of solvent, applying a coating of said polymer upon a surface of said metal, and curing said coating to a flexible, resinous state, adherent to said metal.

4. The method of claim 3 in which said aldehyde is methacrolein.

References Cited by the Examiner
UNITED STATES PATENTS

| 1,944,731 | 1/34 | Diels et al. | 260—73 |
| 2,386,735 | 10/45 | Borders et al. | |
| 2,748,049 | 5/56 | Kalafus | 117—161 |
| 2,952,565 | 9/60 | Contois et al. | 117—132 |

FOREIGN PATENTS

| 545,765 | 6/42 | Great Britain. |

RICHARD D. NEVIUS, *Primary Examiner.*